(12) United States Patent
Bachmat et al.

(10) Patent No.: US 6,584,545 B2
(45) Date of Patent: *Jun. 24, 2003

(54) MAXIMIZING SEQUENTIAL OUTPUT IN A DISK ARRAY STORAGE DEVICE

(75) Inventors: Eitan Bachmat, Lehavim (IL); Yuval Ofek, Framingham, MA (US); Tao Kai Lam, Boston, MA (US); Victoria Dubrovsky, Westboro, MA (US); Ruben Michel, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/229,259

(22) Filed: Aug. 26, 2002

(65) Prior Publication Data

US 2003/0028722 A1 Feb. 6, 2003

Related U.S. Application Data

(63) Continuation of application No. 09/396,275, filed on Sep. 15, 1999, now Pat. No. 6,442,650, which is a continuation-in-part of application No. 09/143,683, filed on Aug. 28, 1998, now Pat. No. 6,189,071, which is a continuation-in-part of application No. 09/002,428, filed on Jan. 2, 1998, now Pat. No. 6,088,706, which is a continuation-in-part of application No. 08/944,606, filed on Oct. 6, 1997, now Pat. No. 6,061,761.

(51) Int. Cl.[7] .............................................. G00F 12/02

(52) U.S. Cl. ...................... 711/114; 711/107; 711/170; 710/105; 710/18

(58) Field of Search ................................ 711/114, 107, 711/120, 148, 111, 112; 710/105, 18; 709/105

(56) References Cited

U.S. PATENT DOCUMENTS

| | | | | |
|---|---|---|---|---|
| 3,702,006 A | | 10/1972 | Page | 709/105 |
| 4,633,387 A | | 12/1986 | Hartung et al. | 709/105 |
| 5,206,939 A | * | 4/1993 | Yanai et al. | 711/4 |
| 5,239,649 A | | 8/1993 | McBride et al. | 709/105 |
| 5,333,315 A | * | 7/1994 | Saether et al. | 707/1 |
| 5,737,742 A | | 4/1998 | Achiwa et al. | 711/103 |
| 5,875,456 A | | 2/1999 | Stallmo et al. | 711/114 |
| 5,974,515 A | | 10/1999 | Bachmat et al. | 711/114 |
| 6,052,759 A | | 4/2000 | Stallmo et al. | 711/114 |
| 6,061,761 A | | 5/2000 | Bachmat | 711/114 |
| 6,088,766 A | | 7/2000 | Bachmat et al. | 711/114 |
| 6,112,257 A | | 8/2000 | Mason, Jr. et al. | 710/18 |
| 6,173,374 B1 | | 1/2001 | Heil et al. | 711/148 |
| 6,189,071 B1 | | 2/2001 | Bachmat | 711/114 |
| 6,237,063 B1 | | 5/2001 | Bachmat et al. | 711/114 |
| 6,341,333 B1 | * | 1/2002 | Schreiber et al. | 711/114 |
| 6,442,650 B1 | * | 8/2002 | Bachmat et al. | 711/114 |
| 6,480,930 B1 | * | 11/2002 | Zakai et al. | 711/105 |

* cited by examiner

*Primary Examiner*—Do Hyun Yoo
*Assistant Examiner*—Brian R. Peugh
(74) *Attorney, Agent, or Firm*—George A. Herbster

(57) ABSTRACT

Load balancing of activities on physical disk storage devices is accomplished by monitoring reading and writing operations to blocks of contiguous storage locations on the physical disk storage devices. A list of exchangeable pairs of blocks is developed based on size and function. Statistics accumulated over an interval are then used to obtain access activity values for each block and each physical disk drive. These activities are represented as disk seek, latency and data transfer times. A statistical analysis leads to a selection of one block pair. After testing to determine any adverse effect of making that change, the exchange is made to more evenly distribute the loading on individual physical disk storage devices.

27 Claims, 10 Drawing Sheets

MAXIMIZING SEQUENTIAL OUTPUT IN A DISK ARRAY STORAGE DEVICE

CROSS REFERENCES TO RELATED APPLICATIONS

This is a continuation of U.S. Pat. No. 6,442,650 issued Aug. 27, 2002 Ser. No. 09/396,275 filed Sept. 15, 1999 that is a continuation-in-part of U.S. Pat. No. 6,189,071 issued Feb. 13, 2001 (Ser. No. 09/143,683 filed Aug. 28, 1998) that is a continuation-in part of copending application for U.S. Pat. No. 6,088,706 issued Jul. 11, 2000 (Ser. No. 09/002,428 filed Jan. 2, 1998) that is a continuation-in-part of copending application for U.S. Pat. No. 6,061,761 issued May 9, 2000 (Ser. No. 08/944,606 filed Oct. 6, 1997) and that are all assigned to the same assignee as this invention.

U.S. patent application Ser. No. 09/396,146, now U.S. Pat. No. 6,480,930, filed on even date herewith for a Mailbox for Controlling Storage Subsystem Reconfigurations and U.S. patent application Ser. No. 09/382,752 filed on Aug. 25, 1999 for a Dynamic Mirror Service Policy with Seek Adjustment ma Non-Physical Mirrored Storage Environment, both assigned to to the assignee of this invention are incorporated herewith by reference.

U.S. patent application Ser. No. 09/396,218, now U.S. Pat. No. 6,341,333, filed on Sep. 15, 1999 for a Method for Transparent Exchange of Logical Volumes in a Disk Array Storage Device and assigned to the assigned of this invention.

BACKGROUND OF THE INVENTION

1. Field of the Invention

This invention generally relates to the management of resources in a data processing system and more particularly to the management of a disk array storage device.

2. Description of Related Art

Many data processing systems now incorporate disk array storage devices. Each of these devices comprises a plurality of physical disks arranged into logical volumes. Data on these devices is accessible through various control input/output programs in response to commands, particularly reading and writing commands from one or more host processors. A Symmetrix 5500 series integrated cached disk array that is commercially available from the assignee of this invention is one example of such a disk array storage device. This particular array comprises multiple physical disk storage devices or drives with the capability of storing large amounts of data up to several terabytes or more. The management of such resources becomes very important because the ineffective utilization of the capabilities of such an array can affect overall data processing system performance significantly.

Generally a system administrator will, upon initialization of a direct access storage device, determine certain characteristics of the data sets to be stored. These characteristics include the data set size, and volume names and, in some systems, the correspondence between a logical volume and a particular host processor in a multiple host processor system. Then the system administrator uses this information to configure the disk array storage device by distributing various data sets across different physical devices accordingly with an expectation of avoiding concurrent use of a physical device by multiple applications. Often times allocations based upon this limited information are or become inappropriate. When this occurs, the original configuration can degrade overall data processing system performance dramatically.

One approach to overcoming this problem has been to propose an analysis of the operation of the disk array storage device prior to loading a particular data set and then determining an appropriate location for that data set. For example, U.S. Pat. No. 4,633,387 to Hartung et al. discloses load balancing in a multi-unit data processing system in which a host operates with multiple disk storage units through plural storage directors. In accordance with this approach a least busy storage director requests work to be done from a busier storage director. The busier storage director, as a work sending unit, supplies work to the work requesting, or least busy, storage director.

U.S. Pat. No. 5,239,649 to McBride et al. discloses a system for balancing the load on channel paths during long running applications. In accordance with the load balancing scheme, a selection of volumes is first made from those having affinity to the calling host. The load across the respective connected channel paths is also calculated. The calculation is weighted to account for different magnitudes of load resulting from different applications and to prefer the selection of volumes connected to the fewest unused channel paths. An optimal volume is selected as the next volume to be processed. The monitored load on each channel path is then updated to include the load associated with the newly selected volume, assuming that the load associated with processing the volume is distributed evenly across the respective connected channel paths. The selection of the following volume is then based on the updated load information. The method continues quickly during subsequent selection of the remaining volumes for processing.

In another approach, U.S. Pat. No. 3,702,006 to Page discloses load balancing in a data processing system capable of multi-tasking. A count is made of the number of times each I/O device is accessed by each task over a time interval between successive allocation routines. During each allocation, an analysis is made using the count and time interval to estimate the utilization of each device due to the current tasks. An estimate is also made with the anticipated utilization due to the task undergoing allocation. The estimated current and anticipated utilization are then considered and used as a basis for attempting to allocate the data sets to the least utilized I/O devices so as to achieve balanced I/O activity.

Each of the foregoing references discloses a system in which load balancing is achieved by selecting a specific location for an individual data set based upon express or inferred knowledge about the data set. An individual data set remains on a given physical disk unless manually reconfigured. None of these systems suggests the implementation of load balancing by the dynamic reallocation or configuration of existing data sets within the disk array storage system.

Another load balancing approach involves a division of reading operations among different physical disk drives that are redundant. Redundancy has become a major factor in the implementation of various storage systems that must also be considered in configuring a storage system. U.S. Pat. No. 5,819,310 granted Oct. 6, 1998 discloses such a redundant storage system with a disclosed disk array storage device that includes two device controllers and related disk drives for storing mirrored data. Each of the disk drives is divided into logical volumes. Each device controller can effect different reading processes and includes a correspondence table that establishes the reading process to be used in retrieving data from the corresponding disk drive. Each disk controller responds to a read command that identifies the logical volume by using the correspondence table to select the appropriate reading process and by transferring data from the appropriate physical storage volume containing the designated logical volume.

Consequently, when this mirroring system is implemented, reading operations involving a single logical volume do not necessarily occur from a single physical device. Rather read commands to different portions of a particular logical volume may be directed to any one of the mirrors for reading from preselected tracks in the logical volume. Allowing such operations can provide limited load balancing and can reduce seek times.

Other redundancy techniques and striping techniques can tend to spread the load over multiple physical drives by dividing a logical volume into sub-volumes that are stored on individual physical drives in blocks of contiguous storage locations. However, if the physical drives have multiple logical volumes, sub-volumes or other forms of blocks of contiguous storage locations, the net effect may not balance the load with respect to the totality of the physical disk drives. Thus, none of the foregoing references discloses or suggests a method for providing a dynamic reallocation of physical address space based upon actual usage.

SUMMARY

Therefore it is an object of this invention to enable a dynamic reallocation of data in a plurality of physical disk storage devices to reduce any imbalance of load requirements on each physical disk storage.

Another object of this invention is to determine the relative utilization of physical disk storage devices to reduce imbalances in the utilization.

In accordance with this invention, the load on a plurality of physical disk storage devices can be balanced by exchanging data blocks on two physical disk storage devices that are divided into blocks of contiguous storage locations. A list of all pairs of exchangeable data blocks on the physical disk storage devices is prepared. Disk utilization statistics are compiled for each data block in each physical disk storage device over a time interval. A configuration with a pair of data blocks on different physical disk storage devices is implemented if an analysis determines that the exchange will improve physical disk storage device operations.

In accordance with another aspect of this invention, access activity on physical disk storage devices that are divided into blocks of contiguous storage locations, is balanced. The balancing is achieved by compiling disk access statistics for each block over a time interval and compiling a list of all pairs of exchangeable blocks on the physical disk storage devices. The compiled disk access statistics are used to generate a disk utilization time that represents the total time required to complete all disk accesses during the time interval. The disk utilization times are used to select a configuration of blocks on the physical disk storage devices with various exchange blocks to determine an optimal exchange. Thereafter the data on the two identified blocks are exchanged.

In accordance with another aspect of this invention, the activity on a plurality of disk storage devices is balanced. At least two of the physical storage devices are divided into a plurality of logical volumes and including movable read/write heads. Balancing is achieved by compiling a list of all pairs of exchangeable logical volumes on the physical disk storage devices, defining an analysis time interval comprising a plurality of subintervals and recording, as a function of time in each subinterval, disk accesses for the transfer of data and the amount of data transferred for each logical volume. Thereafter a disk utilization value is generated in response to the disk accesses and the amount of data transferred as recorded for each logical volume during each subinterval. A pair of logical volumes on different disk storage devices are then selected for an exchange based upon the disk utilization values. A pair of logical volumes is exchanged if it determined that the exchange of the selected pair will improve the total operation of all the physical disk storage devices.

In accordance with still another object of this invention, activity on a plurality of physical disk storage devices is balanced. The physical devices are divided into zones of contiguous cylinders having different characteristic data transfer rates and that store a plurality of logical volumes, wherein each logical volume can be stored in at least one zone. Each physical disk storage device also includes a storage medium that moves at a characteristic angular velocity and read write heads that move between cylinders during seek operations. Balancing is achieved by compiling a list of all pairs of exchangeable logical volumes on the physical disk storage devices and defining an analysis time interval comprising a plurality of subintervals. The number and type of disk accesses and the amount of data transferred during each disk access are recorded, the types of disk accesses being taken from the group of read, sequential read and write to disk accesses. A weighted number of accesses is determined according to the sum of random reads, the number of sequential reads divided by four and the number of disk writes divided by two. For each logical volume and subinterval a disk utilization time is generated that includes the sum of values obtained by generating a seek time value based upon the number of layered accesses, generating a latency time value corresponding to the produce of the total number of random reads, disk writes and the number of sequential read operations and of the time required for the spindle to rotate one-half revolution and by generating a data transfer time by determining the percentage of the logical volume that is located in each zone, apportioning the data transfers to the logical volume according to the determined percentages, generating a data transfer time for each zone according to the amount of data apportioned to the zone and the data transfer rate for that zone in combining the data transfer times for each zone to obtain a data transfer time for the logical volume. Additional utilization times for each subinterval are then summed for each logical volume. A pair of logical volumes on different disk storage devices then is selected for an exchange based upon the relative disk utilization values for each logical volume. The exchange is made if it is determined that the exchange will improve the balance of operations on the physical disk storage devices.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
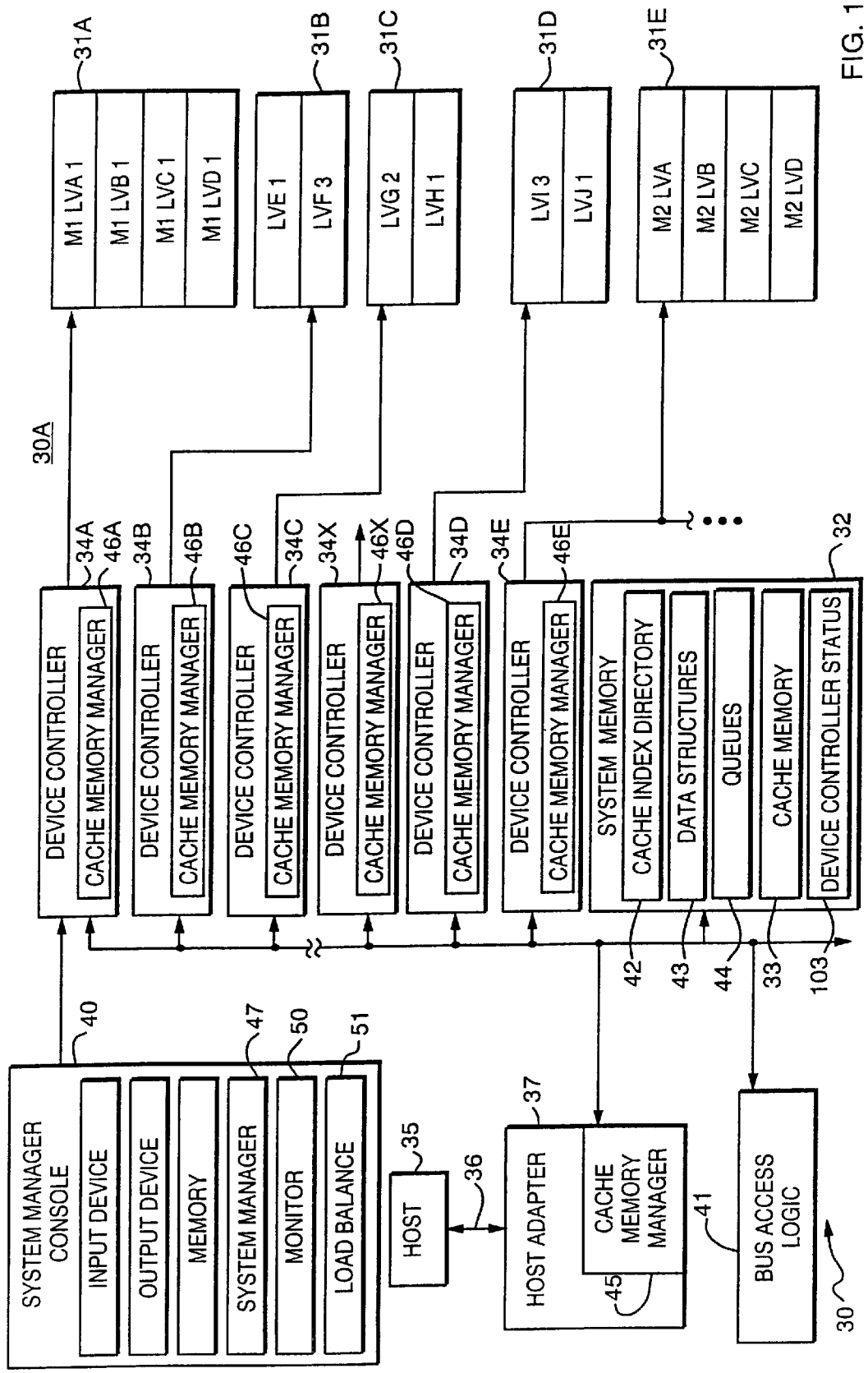
FIG. 1 is a block diagram of a specific data processing system that implements this invention.

FIG. 1 depicts, in block form, and as a typical data processing system 30, a Symmetrix 5500 series integrated cached disk array storage device 30A that includes such a data memory system with a number of data storage devices or physical disk storage devices 31A, 31B, 31C, 31D and 31E, by way of example, and a system memory 32 with a cache memory 33. In this particular embodiment the disk array storage device 30A includes several device controllers 34A, 34B, 34C, 34D and 34E connected to corresponding ones of the physical disk storage devices 31A through 31E plus a device controller 34X representing other controllers and attached physical disk storage devices. Each device controller may have a known basic structure or a more sophisticated structure associated with mirrored operations as described in the above-identified U.S. Pat. No. 5,819,310.

The device controller 34A is shown with an associated physical disk storage device 31A divided into the mirrored logical volumes M1-LVA, M1-LVB, M1-LVC and M1-LVD; the device controller 34E controls the other physical disk storage device 31E that stores the mirrored logical volumes M2-LVA, M2-LVB, M2-LVC and M2-LVD. The logical volumes in physical disk storage devices 31A and 31E are assumed to have the same size for purposes of this explanation. However, mirrored and non-mirrored logical volumes in a physical disk storage device can have different sizes. For example, physical disk storage device 31B is depicted with two logical volumes LVE and LVF.

Assume that the LVE logical volume has the same size as the logical volumes in the physical disk 31A and that the logical volume LVF has a size that is three times the size of the logical volume LVE. Physical disk storage device 31C is shown with a logical volume LVG having twice the size of a logical volume LVH which, in turn, would have the same size as the logical volume LVA. Physical disk storage device 31D has a logical volume LVI which is three times the size of the logical volume LVJ which, in turn, has the same size as the logical volume LVA.

Moreover, there is no requirement that mirrored logical volumes in one physical disk storage device need to be mirrored on a single mirroring physical disk storage device. For example the locations of the LVJ and M2-LVA logical volumes could be interchanged. As will become apparent, in actual practice the absolute and relative sizes of logical volumes and the positions of the logical volumes will vary.

Still referring to FIG. 1 a single processor or host 35, an interconnecting data access channel 36 and a host adapter 37 connect to the system memory 32 over a system bus 38. A typical data processing system 30 may comprise multiple host adapters that connect to the system bus 38 in parallel. One or more hosts may also connect to each host adapter.

A system manager console or service processor 40 includes an additional processor that connects to the system bus 38 typically through one or more of the device controllers, such as device controller 34A by means of a serial or other communications link to the device controller 34A. The system manager console 40 permits a system operator to run set-up and diagnostic programs for configuring, controlling and monitoring the performance of the disk array storage device 30A. Essentially the system manager console 40 enables the operator to establish communications with the host adapter 37, the device controller 342 and the system memory 32. One approach for establishing communications among the various host and disk adapters and the service processor system manager are described in the above-referenced U.S. patent application Ser. No. 09/396,146, now U.S. Pat. No. 6,480,930, filed Sep. 15, 1999.

Before any component, such as the host adapter 37 or the device controllers 34A and 34B can access the system memory 32, that component must obtain access to the system bus 38. Conventional bus access logic 41 receives access request signals from these components and grants access to only one such component at any given time. A wide variety of known arbitration schemes are suitable for use in a data storage system employing multiple processors and a shared system memory, such as the system memory 32.

Preferably the system memory 32 in FIG. 1 is a high-speed random-access semiconductor memory that includes, as additional components, a cache index directory 42 that provides an indication including the addresses of the data which is stored in the cache memory 33. In a preferred embodiment, the cache index directory 42 is organized as a hierarchy of tables for logical devices, cylinders, and tracks. The system memory 32 also includes areas for data structures 43 and queues 44. The basic operation of the system memory 32 is described in Yanai et al., U.S. Pat. No. 5,206,939 issued Apr. 27, 1993. System memory 32, particularly the cache memory 33, may also include a region of memory known as permacache memory. As is well known, data elements remain in permacache memory unless they are specifically deleted.

The coordination of each of the host adapters with each of the device controllers is simplified by using the system memory 32, and in particular the cache memory 33, as a buffer for data transfers between each host adapter and each device controller. Such system, for example, is described in U.S. Pat. No. 5,206,939. In such a system, it is not necessary to provide a processor dedicated to managing the cache memory 33. Instead, each of the host adapters or device controllers executes a respective cache manager program, such as one of the cache manager programs 45 in the host adapter 37 and cache manager programs 46A through 46X in each of the device controllers 34A through 34X. A system manager program 47 performs a similar function for the system manager console 40 and enables the operator to configure the system. Each of the cache manager programs accesses the cache index directory 42 and operates with data structures and queues for storing various commands. More specifically, the cache manager program 45 in the host adapter 37 writes data from the host 35 into the cache memory 32 and updates the cache index directory 42.

In addition, and in accordance with this invention, each cache memory manager gathers statistics. Specifically, the cache memory manager 45 will accumulate statistics concerning a number of parameters. For the purpose of this invention, the number of reading and writing operations requested by a host 35 or connected hosts are important. Likewise each of the cache memory managers 46A through 46X in each of the device controllers 34A through 34X gathers statistics for the logical volumes on each connected physical disk storage device. A monitor 50 in the system manager console 40 integrates these cache memory managers to obtain appropriate statistics at given intervals.

From the foregoing, disk operations included in any measure of the loading of a logical volume will include reading operations and writing operations. Reading operations can be further classified as read-hit, read-miss and sequential read operations. A read-hit operation occurs when the data to be read resides in the cache memory 33. A read-miss occurs when the data to be read is not available in the cache memory 33 and must be transferred from a physical disk storage device. Sequential read operations are those that occur from sequentially addressed storage locations.

The system operates with two types of writing operations. The first transfers the data from the host 35 to the cache memory 33. The second type transfers the data from the cache memory 33 to a physical disk storage device. The second type operates in a background mode, so it is possible that the host 35 may write data to a location more than once before the data is written to a physical disk storage device. Consequently the number of writing operations of the second type normally will not correspond to and will be less than the number of writing operations of the first type.

With this background, the determination of appropriate reallocations of logical volumes on physical disks in accordance with this invention can be described. The program relies upon information supplied from the performance monitor 50 that retrieves statistics from each cache memory manager on a periodic basis. The periodicity will be selected according to conventional sampling criteria. Typical periods will be from up to 15 to 30 or more minutes. As each set of statistics is time stamped and accumulated by logical volume, the total number of read operations, a read-hit ratio, a sequential-read ratio and the total number of writing operations over a test interval can be obtained. The load balance program 51 shown in FIG. 1 then operates according to FIGS. 2A and 2B to generate, from that collected monitored performance generally represented by step 60 in FIG. 2A, a reallocation or exchange of a pair of logical volumes.

Specifically, when it is time to perform an analysis, a wait loop represented as a decision step 61 transfers control to retrieve, by means of the performance monitor 50 in step 62, all the statistics that are relevant to the test interval.

The load balance program 51 uses step 63 to define a list of pairs of exchangeable logical volumes. There are several criteria that must be evaluated in determining this list. First, exchangeable logical volumes must have the same size. In actual practice most logical volumes will be selected from one of a relatively small number of physical sizes. Second, any interrelationship between the two logical volumes to be exchanged must be examined to determine whether there is any reason to preclude the exchange. For example, swapping logical volumes on the same physical disk storage device generally will have little or no impact. Mirroring, as described in the above-identified U.S. Pat. No. 5,819,310 or other redundancy may further restrict the available exchangeable pairs of logical volumes. For example, mirrored logical volumes normally will be precluded from residing on the same physical disk storage device or even on physical disk storage devices on the same controller or adjacent controllers. For RAID-5 redundancy, exchangeable pairs of logical volumes usually will be limited to those in the same parity group.

In the specific example of FIG. 1, based on size, the logical volumes LVA through LVE, LVH and LVJ are all potential exchange candidates. Likewise the logical volumes LVF and LVI are candidates for exchange. There is no logical volume as a candidate for exchanging with the LVG logical volume in the specific embodiment shown in FIG. 2.

Using the functional criteria, the potential logical volumes that could be swapped with the logical volume M1-LVA in the physical drive 31A include logical volumes LVE, LVH and LVJ, assuming that an exchange with a mirror would have no effect. Swapping the LVA logical volume in physical disk 31A with any of the logical volumes LVB through LVD in physical drive 31E is precluded because both mirrors of the logical volume LVA would be resident on the same physical disk drive. Other potential logical volume pairs include the pairs LVE-LVH, LVH-LVJ and LVE-LVJ. The logical volumes LVF and LVI define one exchangeable pair. Thus in this particular embodiment there are twenty-seven possible exchangeable pairs of logical volumes.

In step 64, the load balance program uses the accumulated statistics and read-hit ratio to produce a read-miss value, a sequential-read value and a write-to-disk value for each logical volume over the prior test interval. As previously indicated the read-miss value corresponds to the number of read operations that require access to a physical disk drive for data, a read-hit being a reading operation that finds the requested data in the cache memory 33 of FIG. 1. When step 64 is completed, there exists, for each logical volume, a logical Volume access activity value, x, represented by the sum of the read-miss and write-to-disk operations.

The logical volume access activity value can be further refined to reflect the actual load imposed by different operations. For example, each write operation can be considered as imposing half the load of a read-miss operation. If such an assumption is carried forward, the logical volume access activity is equal to the total number of read-miss operations plus half the total number of write operations. If a series of sequential-read operations occur, the number of events in the sequence can be divided by 4 or some other number to compensate for the difference in loading imposed by sequential and random reading operations. In a mirrored configuration, a read-miss results in only one read operation being performed although there is a potential for two, one from each mirror. Consequently, in a mirrored system the number of read misses to a mirrored logical volume will be halved to compensate for mirroring.

In step 65 the load balancing program 51 constructs a table that identifies the total access activity value for each physical storage device by summing, for each physical disk storage device, the access activity values for each logical volume on that physical disk storage device. At this point a total average physical activity value can also be obtained by summing the physical volume access activity values and dividing by the number of physical devices.

Figure 2A:
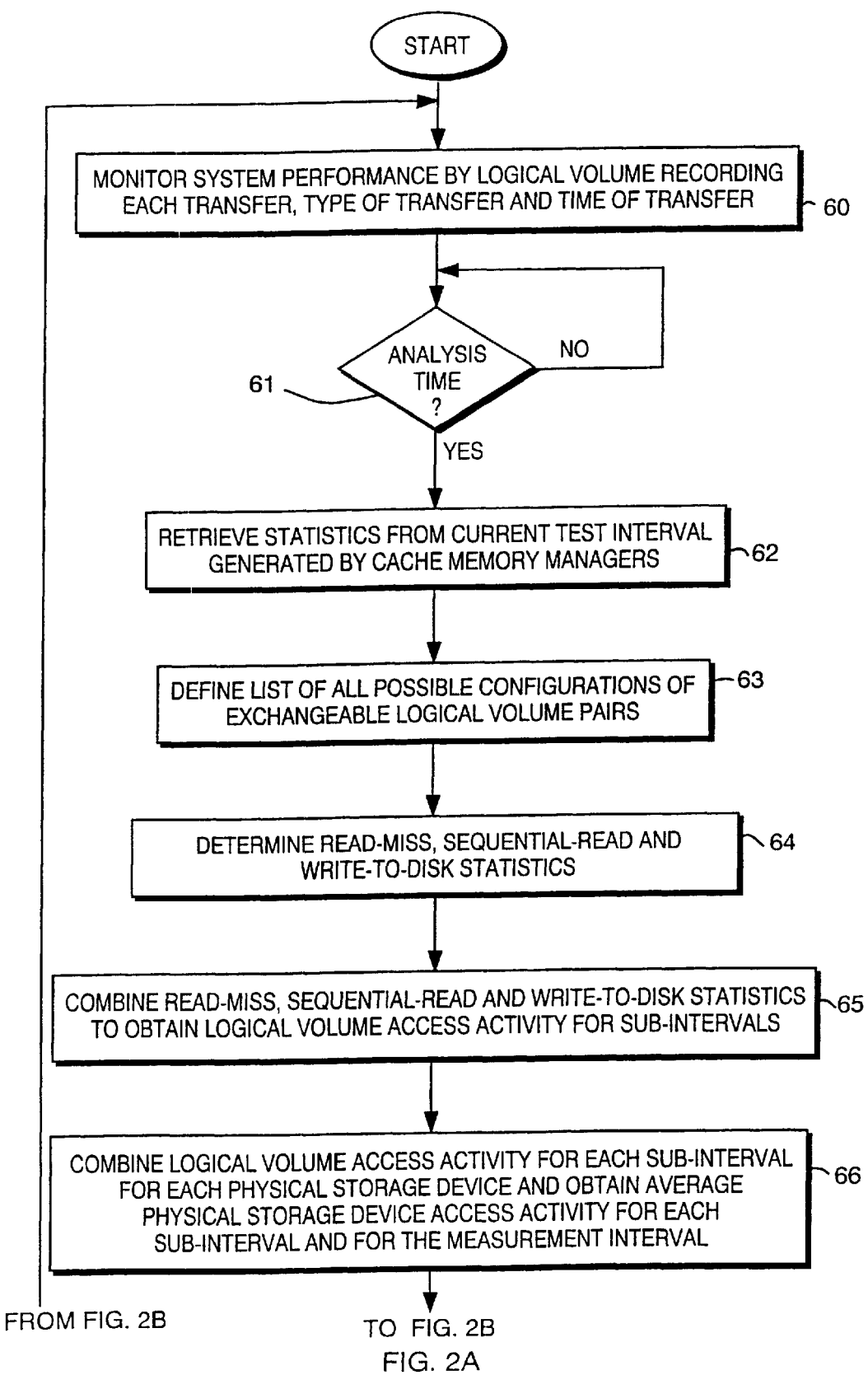
FIGS. 2A and 2B constitute a flow diagram that depicts one procedure for selecting and exchanging logical volumes in accordance with this invention.
Figure 2B:
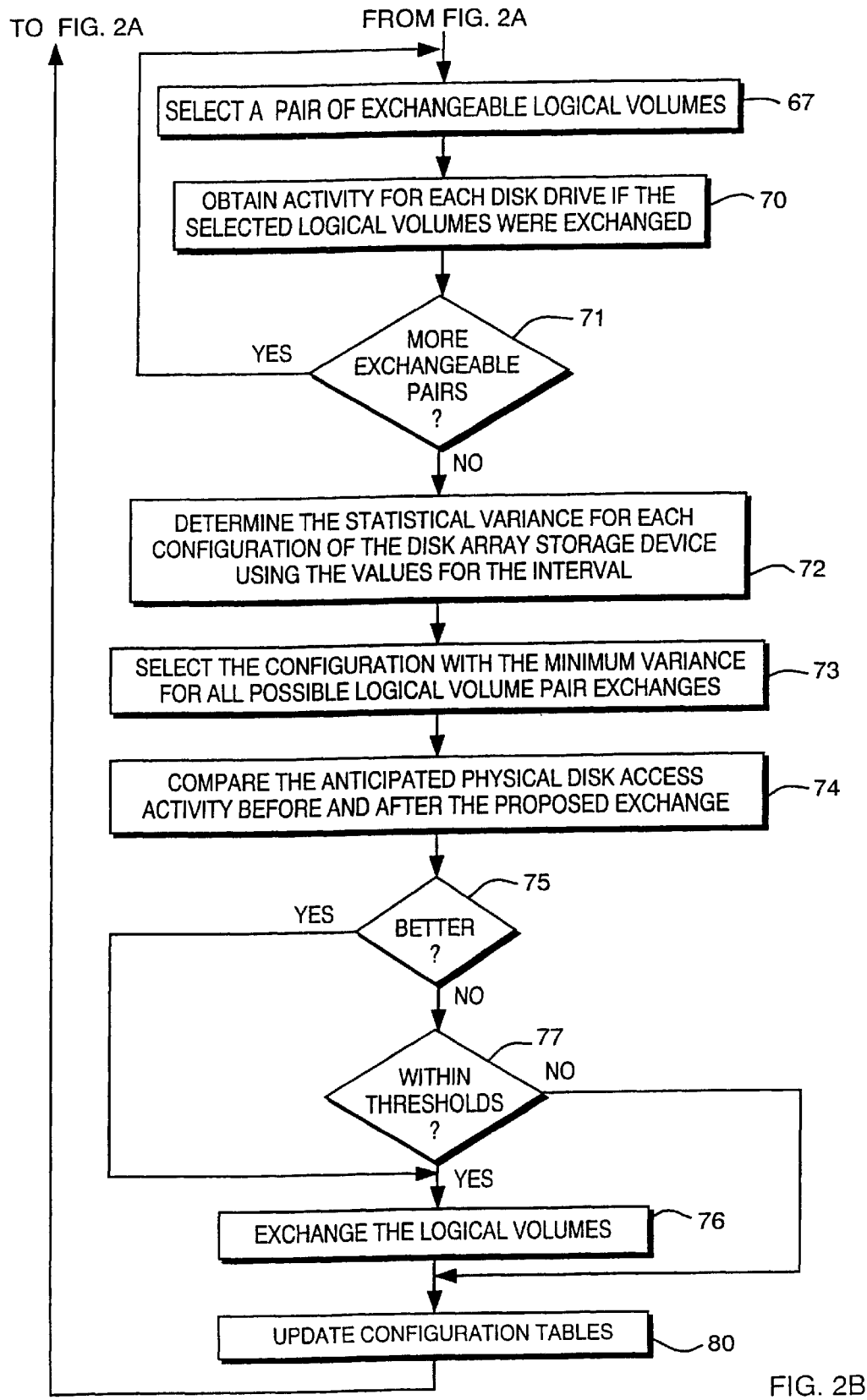

When step 66 in FIG. 2A has been completed, control passes to steps 67 and 70 that form a loop under a loop control 71 in FIG. 2B. Specifically step 67 selects a pair of logical volumes from the list developed in step 63 of FIG. 2A. Assume, for example, that the pair M1 LVA-LVE is selected. In step 70 the load balancer program 51 utilizes the accumulated statistics for obtaining the activity for each physical disk drive as if those two logical volumes had been exchanged. This loop continues until all the logical volume pairs in the list have been evaluated. Once this occurs, control branches to step 72 to define a statistical variance for each configuration according to:

$$|E(x^2)-[E(x)]^2|_{min} \qquad (1)$$

That is, for each possible configuration the load balance program 51 step 72 determines the average access activity value for the physical disk storage devices with the logical volume pairs and obtains a difference from the average physical drive access activity value obtained in step 65 assuming each pair is exchanged. Thereafter step 72 produces the statistical variance for each logical volume pair exchange. In step 73 the load balancer program 51 selects a logical volume pair that produces the minimum statistical variance. Processes for obtaining the above-identified statistical variances are well known in the art.

After that selection, the identity of the logical-volume pair is used in a pretest of the selection. As previously indicated, the monitor 50 accumulates data as discrete sets on a periodic and recorded time basis. In step 74 the load balancing program breaks the total test interval into subintervals that may include one or more sampling periods. Next the activity values for each subinterval or group of subintervals are determined. If the access activity value for exchange effected physical drives is less than the original, step 75 branches to step 76 to initiate the exchange. If a subinterval exists that exceeds the average, step 77 determines whether the access activity value is within an acceptable limit. If it is, the exchange occurs in step 77 and the configuration tables in the system are updated to reflect the new configuration. Otherwise no exchange is made.

When step 76 exchanges the designated logical volumes, such an exchange, or swap, can occur by selecting an unused area in one of the physical disk drives to operate as a buffer. This may be an unused area in a physical disk storage device or in a dynamic spare physical disk storage device. The general use of physical disk storage devices as dynamic spares is known in the art. In other circumstances it may be possible to utilize a cache memory such as the cache memory 33 in FIG. 2, as a buffer. If a single buffer is to be used and logical volumes LVE and LVJ are to be exchanged, a concurrent copy or other transfer sequence can move (1) the LVE logical volume to the buffer, (2) the logical volume LVJ to the corresponding area in the physical disk storage device 31B and (3) the logical volume buffer to the area in physical disk storage device 31D. The use of a concurrent copy or other analogous procedure enables the exchange to occur on-line, albeit with some performance degradation for the duration of the transfer. After the exchange is completed, control branches back to step 60 in FIG. 3A to initiate the monitor 50 thereby to accumulate additional statistics about the new configuration.

In accordance with this specific example, assume that both the logical volumes LVE and LVF in physical disk storage device 31B have become very active and that the logical volume LVJ on physical disk storage device 31D is relatively inactive. If all other logical volumes were equally active, the statistical variance should be minimal when the logical volume pair LVE and LVJ is selected. Therefore those two volumes would be exchanged thereby decreasing the load on the physical disk storage device 31B and increasing the load on the physical disk storage device 31D, but not to the extent that had existed on the physical disk storage device 31B.

Figure 3:
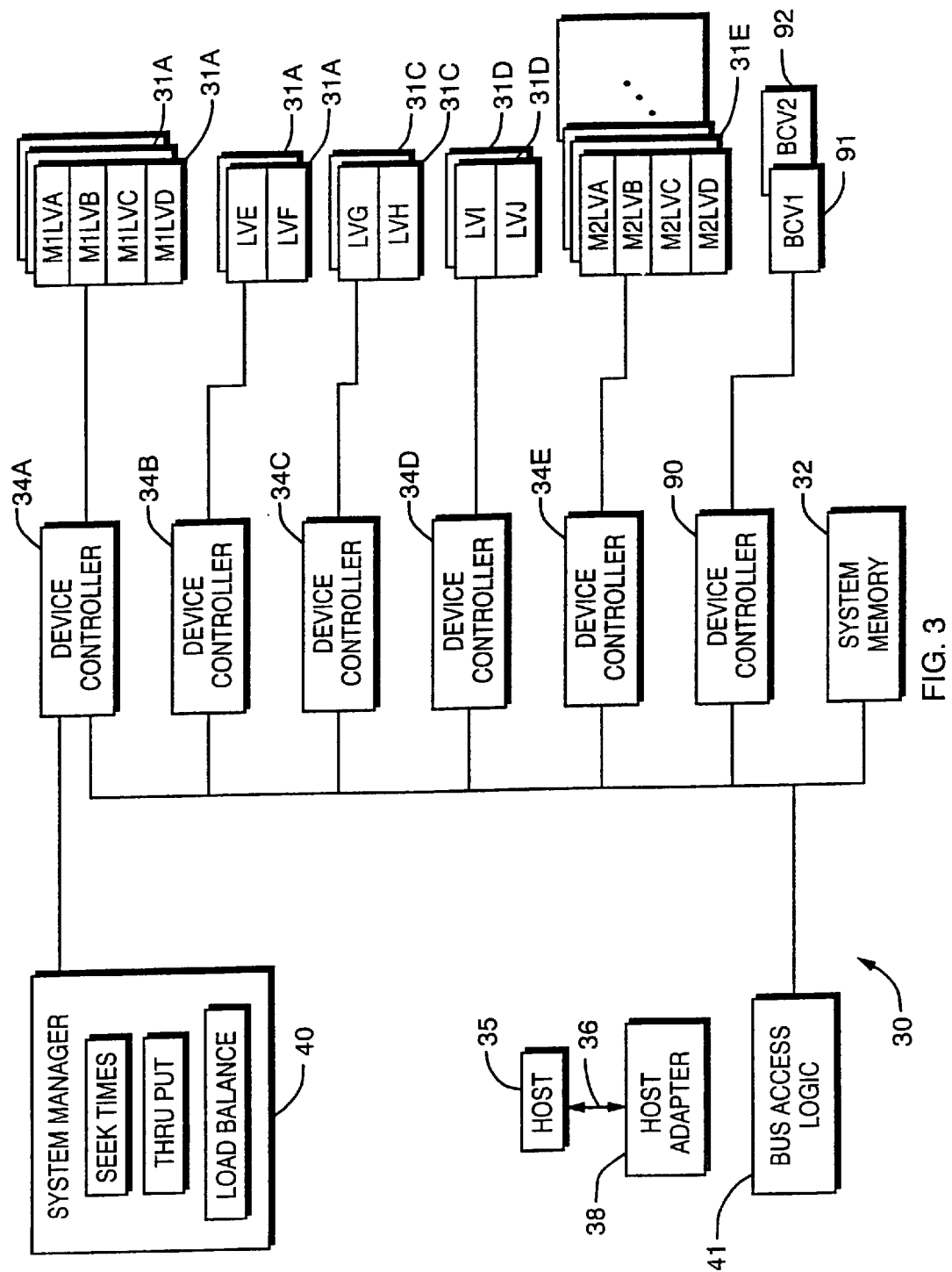
FIG. 3 is a block diagram of another specific data processing system that provides another type of data exchange.

Still other methods can be used to effect the swap. FIG. 3 depicts a modification of the circuit in FIG. 1. in which like reference numerals apply to like items in FIGS. 1 and 3. The modification of FIG. 3 primarily consists of the addition of a device controller 90 with two storage or logical volumes 91 and 92. Although a single device controller 90 and two storage devices 91 and 92 are depicted, storage devices 91 and 92 may connect through different device controllers. A device controller may also control a storage device, such as the storage device 92 and one or more other storage devices.

Each of the storage devices 91 and 92 in FIG. 3 is defined as a DRV device as described in the foregoing U.S. patent application. Ser. No. 09/396,218, now U.S. Pat. No. 6,341,333, filed Sep. 15, 1999. Still other approaches could be applied to the swapping or exchange operation.

Figure 4A:
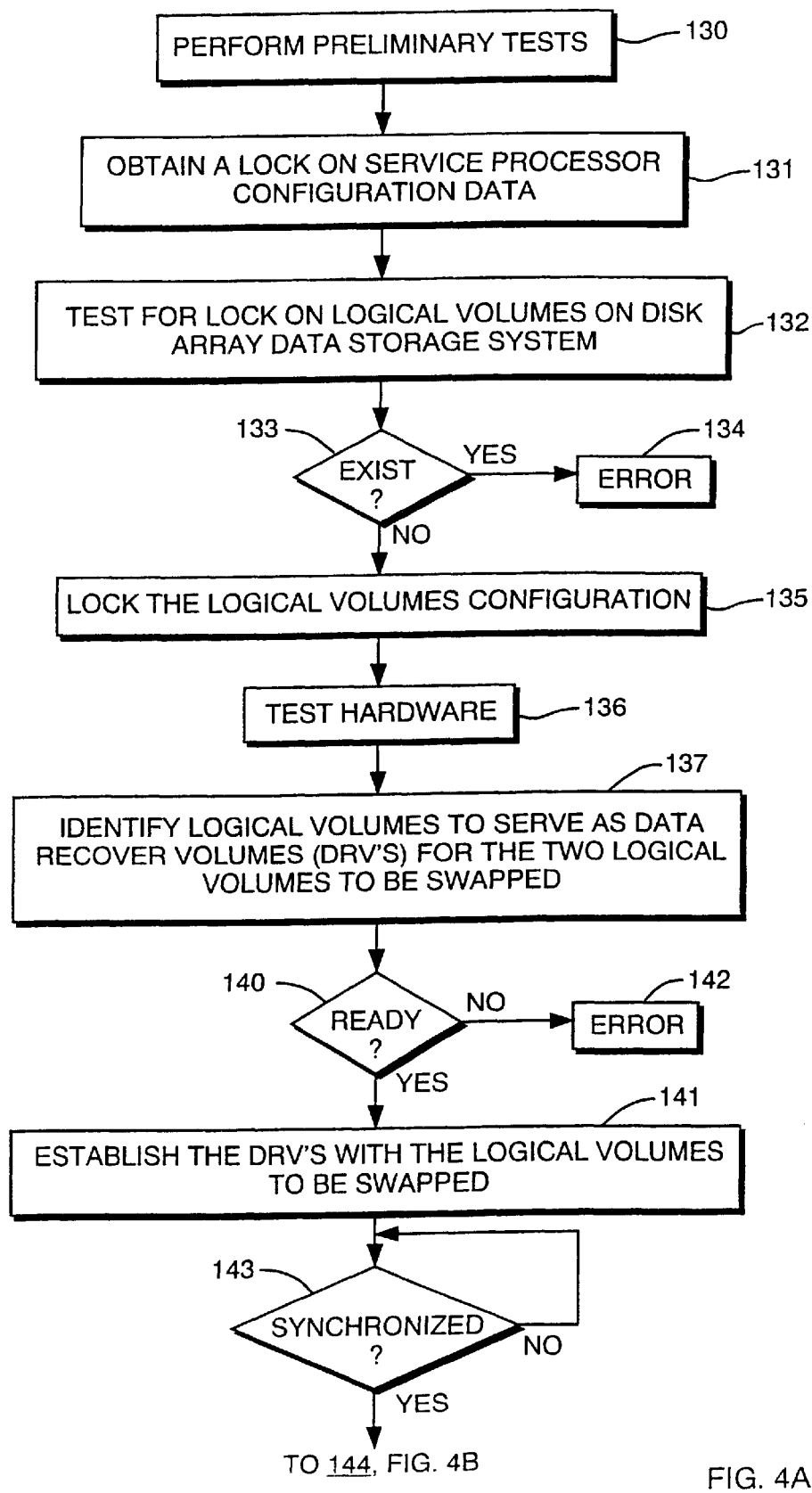
FIGS. 4A and 4B constitute a flow diagram that depicts the implementation of this other procedure for exchanging logical volumes.
Figure 4B:
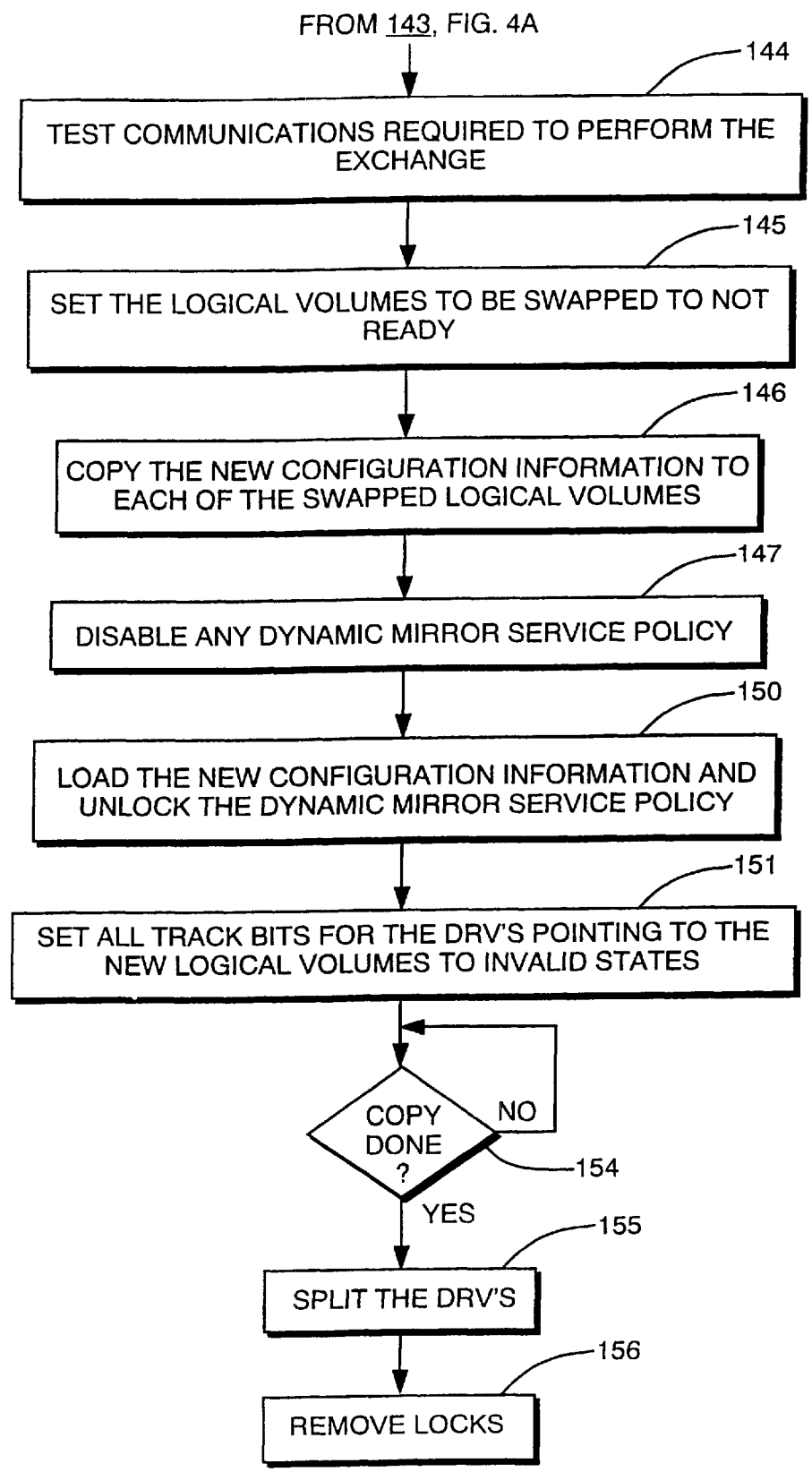

Thus, the procedure outlined in FIG. 4 provides a means for exchanging data blocks in a very efficient manner by using DRV logical volumes as available buffer memories. Moreover, the exchange can be made with little or no impact on the operations of the data processing system.

Figure 5A:
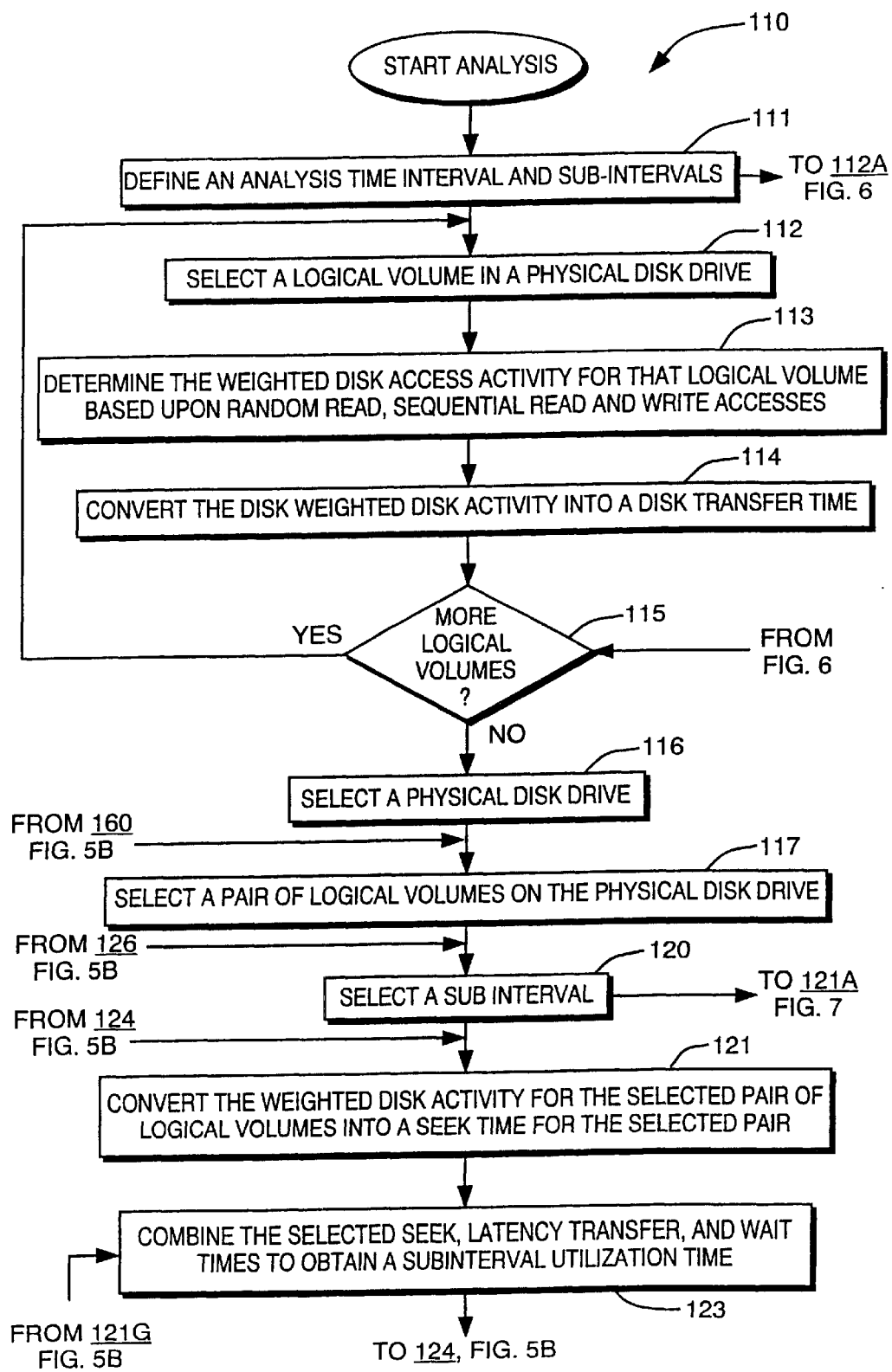
FIGS. 5A and 5B constitutes a flow diagram that depicts an alternative procedure for identifying logical volumes to be exchanged.
Figure 5B:
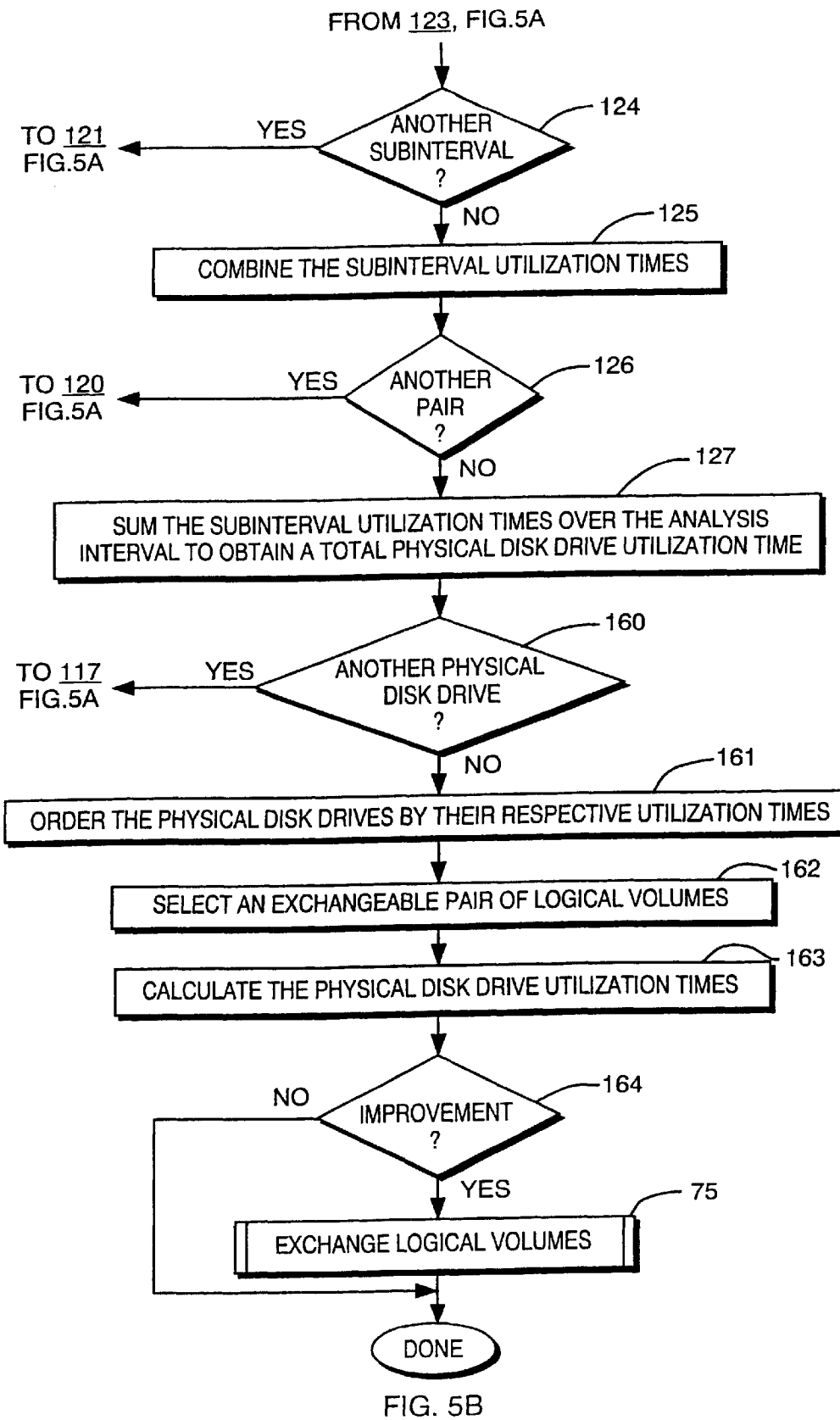

Steps 62 through 77 in FIGS. 2A and 2B depict a procedure for performing analysis based upon disk utilization for each exchangeable logical volume as determined by the total number of accesses to a physical disk drive and logical volumes that are the targets of I/O requests. FIGS. 5A and 5B depict a procedure for analyzing load balance using time-based disk utilization statistics as a criterion. This procedure has achieved improved results in many applications.

The analysis time interval for this procedure can be measured in terms of a few hours to days or weeks or longer. Subintervals can also be of arbitrary length ranging from a few minutes to an hour or more. As will become apparent, the duration of a subinterval is a tradeoff between the accuracy of sampling which is desired and the number of calculations that must be performed on the samples. The duration of the analysis time interval depends, in part, upon a time that provides some reasonable level of consistent performance. These can be generally selected with experience. An initial selection of an analysis time interval of one week and subintervals in the order of fifteen minutes has been found to be satisfactory in many applications.

Step 112 represents a conventional procedure by which the system selects a logical volume as a data block for analysis. The system then uses step 113 to count the number of disk accesses and segregate them into independent disk read, disk write and sequential pre-fetch read categories. These counting operations are upheld in each logical volume for each of the subintervals in the analysis time interval. It has been found that weighting this information can improve the overall result, particularly a weighting of 1.0 for independent disk reads, 0.5 for disk writes and 0.25 for sequential pre-fetch reads. Other weightings may also be effective.

The procedure of step 114 converts the weighted disk activity into disk transfer times representing the time to complete the transfer exclusive of any seek operations. That is, the disk transfer time will correspond to any latency time plus the time for transferring selected data. This conversion can be provided by arbitrary or experimental data contained in a table that may represent an average of all systems or specific systems by model and manufacturer. The data may be manufacturer's design data or may reflect specific measurements at one track on a physical disk drive or at a plurality of spaced tracks.

Figure 6:
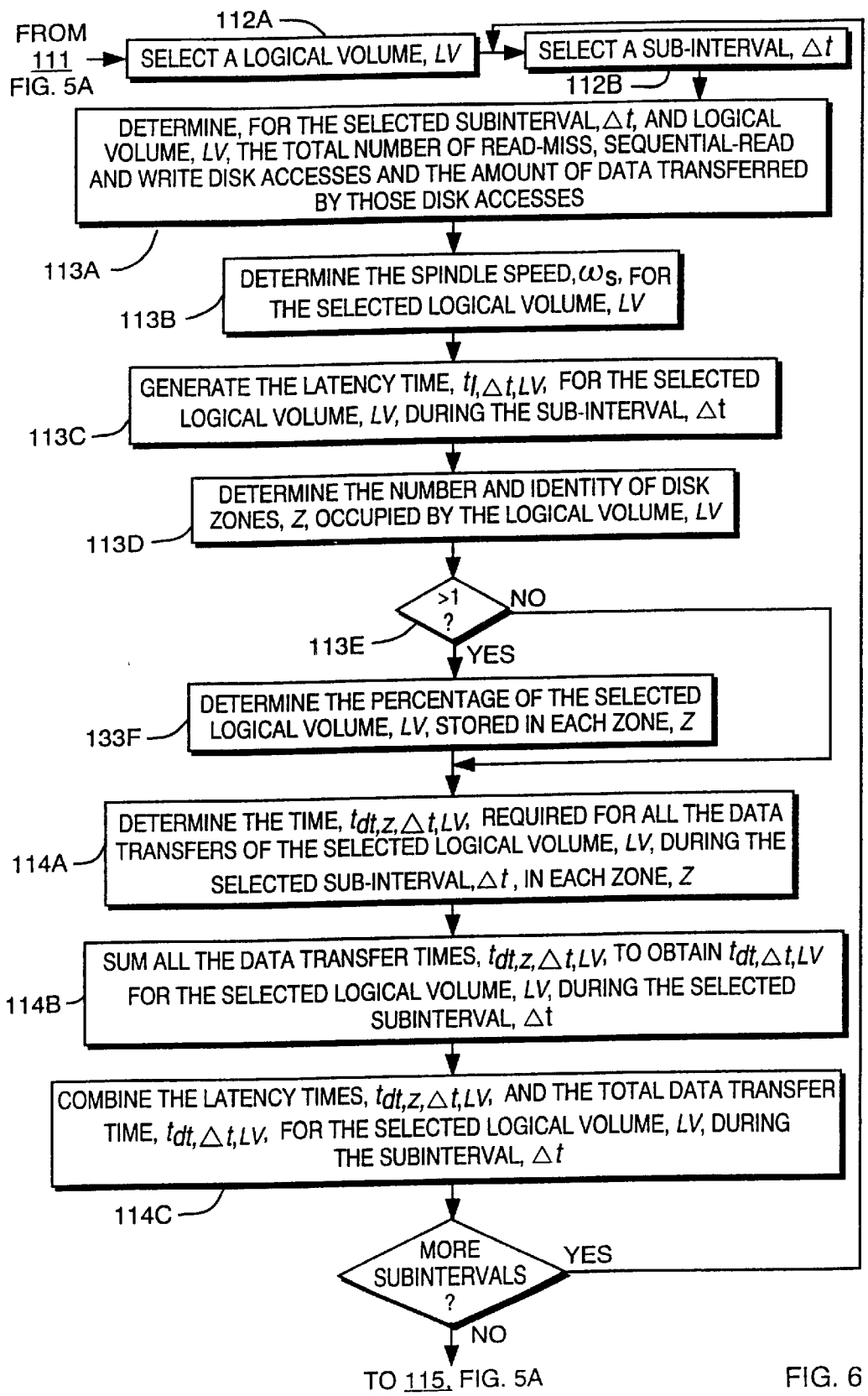
FIG. 6 constitutes a flow diagram that depicts another alternative procedure for identifying logical volumes to be exchanged.

The data accumulated in steps 112 through 114 provides a good approximation of disk utilization values during each individual subinterval. These incremental utilization values can then be summed and combined to obtain disk utilization time as described in conjunction with the rest of the steps of FIGS. 5A and 5B. Before describing these steps, however, it will be helpful to discuss other information that can be gathered to improve the estimated utilization times even further by incorporating additional information available about the operation of the physical disks. FIG. 6 discloses a procedure that benefits from two characteristics of a physical disk storage device, namely: its spindle speed and its data transfer rate. Either one or both these characteristics can be used with the seek time to obtain a disk utilization time.

As known, each manufacturer provides various operational data about its physical disk storage units. One is the rotational speed of the media on the spindle, that is defined as ωs; the other, a data transfer rate, $D_r$. The data transfer rate, $D_r$, may be provided as a constant rate for all cylinders in the physical disk storage device. However, many disk manufacturers group adjacent tracks into Z concentric zones, z, i.e. $0 \leq z \leq (Z-1)$, each zone, z, having its own data transfer rate, $D_{r,z}$. In such devices the data transfer rate from the outermost zone will have the greatest value; the data transfer rate from the innermost zone, the lowest data transfer rate. Such information may be stored in the service processor 40 of FIG. 1 as a table having the following information:

DISK INFORMATION TABLE

Disk ID
Rotational Speed (ωs)

| Zone | Size (MBytes) | Data Transfer Rate (Mbytes/Sec.) |
|---|---|---|
| 0 | 2.4 | 19 |
| 1 | 2.2 | 16 |
| . | . | . |
| . | . | . |
| . | . | . |
| Z | 1 | 10 |

The service processor 40 of FIG. 1 could contain one such table for each type of physical disk storage device used in a disk array storage system. Most disk array storage systems include physical disk storage devices of a single type manufactured by a single manufacturer or at most a very limited number of manufacturers or types. Consequently any requirements for storing this information in the service processor 40 will be limited. Alternatively, the different values might also be stored as program constants or as constants derived from tables during an initialization procedure, as will be known to those of ordinary skill in the art.

With this information the disk utilization time for a logical volume during a subinterval becomes the total of one or more of the following factors, namely, the sum of: (1) the disk seek time, (2) the disk latency time and (3) the data transfer time. FIG. 6 depicts a procedure that adds the generation of latency times and data transfer times. As will become apparent, each of the procedures for generating each of the disk seek, latency and data transfer times will require service processor resources. Although it is anticipated that the generation of all three times will normally occur, limits on those resources or even the nature of the data accesses may require or permit a sufficiently accurate disk utilization time to be generated using any one or combination of the disk seek, latency and data transfer rate times.

FIG. 6 uses the reference numerals 112, 113 and 114 with letter suffices to more clearly delineate the correlation between the process shown in FIG. 6 and in FIG. 5A. For example, step 112 in FIG. 5A selects a logical volume in physical disk drive, step 112A selects a logical volume, LV, while step 112B selects a subinterval Δt. As will also become apparent, the procedure of FIG. 6 could also be positioned or included as an addition to steps 125 or 127 in FIG. 5B.

Like step 113 in FIG. 5A, step 113A in FIG. 6 determines, for a selected subinterval, $_\Delta t$, and logical volume, LV, a total number of read miss, sequential-read and write disk accesses. In addition step 113A determines the amount of data transferred by those various disk accesses. As previously discussed, the number of disk accesses are weighted as previously described such that:

$$\text{Weighted Accesses} = N_{rm} + \frac{N_{wr}}{2} + \frac{N_{sr}}{4} \quad (2)$$

where $N_{rm}$ and $N_{wr}$ represent read-miss accesses and write accesses. $N_{sr}$ represents the number of sequential read access operations that occur during the subinterval. If the access activity in a subinterval includes 10 read miss accesses, 20 write accesses and 8 sequential read accesses, $N_{rm}=10$, $N_{wr}=20$, $N_{sr}=8$, and there will be a total of 38 accesses. However, according to Equation (2), the number of weighted accesses will be 22.

Step 113B retrieves the spindle speed, $\omega_s$, for the physical disk storage device that contains the logical volume to be analyzed. Step 113C generates the latency time $t_{1,\Delta t,LV}$, for the selected logical volume during the subinterval according to:

$$t_{l,\Delta t,LV} = \frac{k}{\omega_x}(N_{rm} + N_{wr} + N_{sr}). \quad (3)$$

In the foregoing example with 38 accesses, the latency time is proportional to the number of accesses and inversely proportional to the spindle speed, $\omega_s$. In a preferred embodiment k=0.5 indicating that it is assumed that, on average, there will be one-half revolution of the media between the end of each seek operation and the beginning of a consequent data transfer.

The second factor involved in this analysis is the sum of the times required to actually perform the data transfers in response to the data accesses to the logical volume during the subinterval. As previously indicated, most manufacturers today provide information about the data transfer rates broken down into different zones. Step 113D then defines the number and the identity of the disk zones, z, occupied by the logical volume, LV, under test. Conventional configuration information available will provide this correspondence. Specifically, if a physical disk storage device stores multiple logical volumes, the size of each logical volume is known and fixed. The order in which the logical volumes are stored on the disk is also known.

If a logical volume is stored within a single zone, then the data transfer rate for that logical volume will be constant at the data transfer rate for that zone. If, however, a logical volume spans multiple zones, step 113E transfers control to step 113F to determine the percentage or portion of the logical volume that lies in each zone. For example, if a 1 Mbyte logical volume included 200 Kbytes in zone 0 and 800 Kbytes in zone 1, the percentages would be 20% for zone 0 and 80% for zone 1.

Whether the logical volume occupies a single zone or multiple zones, control passes to step 114A to enable the system manager or service processor 40 to generate a time $t_{dt,z,\Delta t,LV}$, required for all the data transfers to have occurred with the selected logical volume during the selected subinterval in each zone according to:

$$t_{dt,z,\Delta t,LV} = \frac{|\text{Data}|}{D_{r,z}} \quad (4)$$

If the logical volume is incorporated in a single zone, then the Equation (4) provides the quotient of the total data transferred to and from the logical volume over the subinterval divided by the constant data rate for the entire logical volume. For multiple data zones, the transferred data is apportioned across the different zones according to the percentages of the logical volume in each zone. In the foregoing example, 20% of the accesses of the data written would be assigned to zone 0 and 80% to zone 1. Assume 200 Kbytes of data had been transferred. Using a disk having the characteristics according to the foregoing Disk Information Table, the data transfer time in seconds for the logical volume in the subinterval would be:

$$t_{dt,\Delta t,LV} = \frac{0.040}{19} + \frac{0.160}{16} \qquad (5)$$

Steps 114A and 114B represent this process.

Step 114C then combines the latency times, $t_{1,\Delta t,LV}$, and the total data transfer time, $t_{dt,\Delta t,LV}$, for the selected logical volume, LV, during the subinterval $\Delta t$. If more subintervals are involved, step 114D returns control to step 112B. Otherwise control passes to step 115 in FIG. 5A.

In essence FIG. 6 depicts a procedure that provides time factors for use in generating a disk utilization time. It has been found that this procedure improves the accuracy of the data utilization times and, consequently provides a more predictable result in the exchange of logical volumes with respect to balancing load activity on the various physical disk storage devices.

Once this information has been generated for a particular logical volume or other data block by any of the foregoing methods, step 115 determines whether additional logical volumes exist that remain untested. If more logical volumes exist, control passes back to repeat steps 112 through 114.

After all the logical volumes have been processed to obtain the disk transfer times and latency times for each logical volume and each subinterval, step 115 diverts control to step 116. Step 116 begins an analysis that provides the utilization times for the logical volumes. Specifically steps 116, 117 and 120 select, in order, a physical drive, a pair of logical volumes on that drive and a subinterval. For each subinterval step 121 converts the number of accesses to the selected pair of logical volumes is converted into a seek time T(seek)d for a given drive, d, segregated into N logical volumes according to:

$$T(seek)_d = \left[ \frac{\sum_{i!=j} T_{i,j} * A_i * A_j}{\sum_{k=1}^{N} A_k} \right] \qquad (6)$$

wherein $T_{ij}$ represents the seek time and $A_i$ and $A_j$ represent the respective weighted activities for each of two selected logical volumes for a given pair (i,j) of logical volumes on the disk drive d, wherein $1 \leq i \leq N$, $1 \leq j \leq N$, and $i \leq >j$, and wherein the sum of $A_k$ for all values of k, i.e., $1 \leq k \leq N$ represents the total number of weighted accesses to the physical disk storage device, d. Equation (6) thus provides a statistical representation of the number of seeks and seek time between the logical volumes i and j based upon the activity to each logical volume in that drive over the subinterval. The sum for all logical volume pairs on the physical disk drive represents the total amount of seek time conducted by the physical disk drive for the selected subinterval.

There are several ways to determine the seek time $T_{ij}$. In one approach a seek time table records the seek time between each pair of tracks for each type of drive. This seek time can be based upon manufacturer supplied data, sample measurements, in situ measurements or other procedures. Data based upon sample measurements has provided good results.

The monitor 50 in FIG. 1 will additionally contain in its configuration table a center-line track position of each logical volume on a physical disk drive. This information will provide, for any seek operation, the starting and ending tracks based upon the centerline track position. It has been found that the use of a centerline track position also provides good results. The starting and ending centerline tracks can then used as an entry into the seek time table information for the corresponding disk drive to obtain the $T_{ij}$ time for that specific disk drive. Thus, for a given pair of logical volumes, the seek time T(seek)d derived from Equation (6) provides a good statistical approximation the total seek time involved for the specified pair of logical volumes during the subinterval.

In many applications the time and other resources required for the system manager to calculate the disk seek times for various volumes can be individually long or burdensome. An alternate approach has been found that also provides an acceptable seek time value but with a significantly reduced burden on the resources of the system manager 40. As described in the above-identified U.S. patent application Ser. No. _____ (Atty. No. 07072/925001), another seek-time function, New T(seek)$_d$, is given by:

$$NewT(seek)_d = \frac{\sum_{i=1}^{N} \sum_{j=1}^{N} A_i * A_j |i - j|}{\sum_{k=1}^{N} A_k} \qquad (7)$$

An analysis of Equations (6) and (7) shows that Equation (7) provides an acceptable disk seek value. As will now be shown, equation (7) can be manipulated to provide a very simple solution that greatly reduces the burden on the resources for determining seek times. In some applications, this procedure has provided an 8:1 reduction in the time required to obtain the seek times. As will be apparent, such a reduction in the burden is highly desirable.

Specifically, if the sum of activities, $A'_i$, for each logical volume is computed as:

$$A'_i = A_1 + A_2 + \ldots + A_i \qquad (8)$$

Substituting Equation (8) in Equation (7) and manipulating the terms yields another value for disk seek time, New T(seek), that is given by:

$$NewT(seek) = \sum_{i=1}^{N} A'_i - \frac{\sum_{i=1}^{N} A'^2_i}{A'_N} \qquad (9)$$

where $A'_i$ is the sum of the activities for all the logical volumes; that is:

$$A'_N = A_1 + A_2 + \ldots A_N \qquad (10)$$

Figure 7:
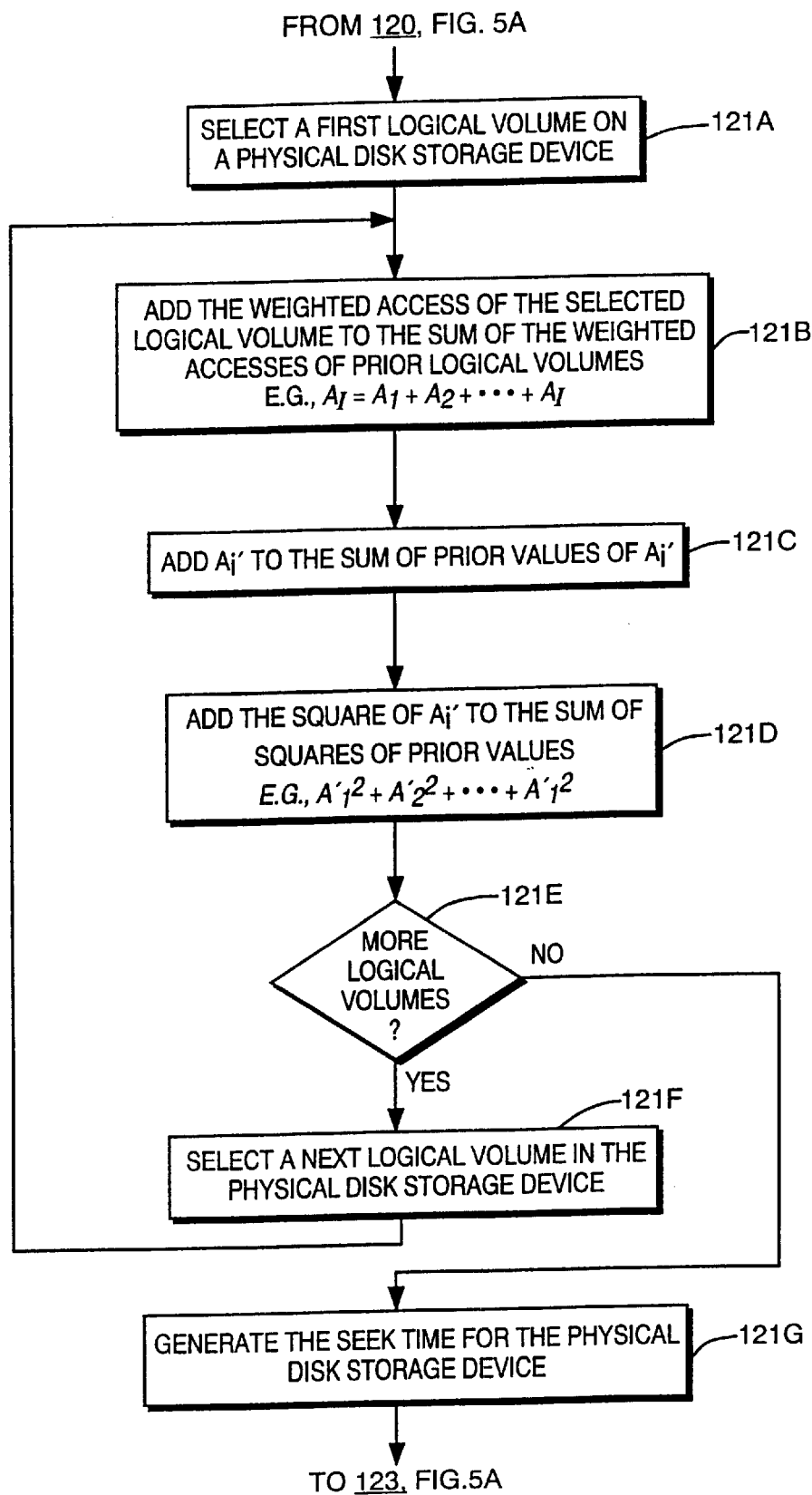
FIG. 7 constitutes a flow diagram that depicts an alternate procedure for obtaining a disk operating characteristic in accordance with this invention.

FIG. 7 depicts a method for determining disk seek times using equations (9) and (10) that can replace the procedure or step 121 in FIG. 5A. Consequently, FIG. 7 uses reference numeral 121 with letter suffices to designate the specific steps.

When control passes from step 120 in FIG. 5B to the procedure in FIG. 7, step 121A selects a first logical volume on a physical disk storage device to be analyzed.

Step 121B then adds the weighted access of the selected logical volume to the sum of the weighted accesses of prior logical volumes. During the analysis of the first logical volume, the sum of the weighted accesses of prior logical volumes, as apparent, will be 0. For successive logical volumes step 121B produces a value for the variable $A'_i = A_1 + \ldots + A_i$.

Step 121C then sums the weighted access with the sum of the prior values of the summed weighted access. After processing the first logical volume, step 121C produces a value of $(A'_1 + A'_2 + \ldots + A'_i)$ Step 121D then adds the square of $A'_i$ to the sum of the squares of previous values of $A'_i$. That is, step 121D provides a value of $[(A'_1)^2 + (A'_2)^2 + \ldots + (A'_i)^2]$.

If there are more logical volumes step 121E transfers control to step 121F whereupon a next logical volume is selected. In a specific implementation with systems supplied by the assignee of this invention, the selection process is orderly. Specifically, each physical disk storage device stores its logical volumes at assigned positions. The first selected logical volume in step 121A should be the first logical volume on the physical disk storage device. Step 121F should select the second through Nth logical volumes in the same order.

After step 121F makes a selection, control passes back to step 121B. This loop continues until all the logical volumes have been processed. Then step 121E transfers control to step 121G to generate the seek time for the physical disk storage device according to Equation (9) to compute the New T(seek)$_d$. More specifically, the value $A_N$ obtained in step 121B becomes the denominator in the right-hand term Equation (9); the value obtained in step 121D, the numerator of that right-hand term. Step 121B provides the value for the left-hand term. Stated differently, Equation (9) becomes:

$$NewT(seek) = \text{Value from } 121D - \frac{\text{Value from } 121B}{\text{Value from } 121C} \quad (11)$$

As will now be apparent, the direct solution of either equation (6) or (7) requires a procedure that uses an outer calculation loop for various values of i and an inner calculation loop for various values of j; i.e., a two-loop solution. The time required to perform such calculations will then increase approximately as the square of the number of logical volumes in a physical disk storage device. Equation (9) when implemented according to FIG. 7 provides the result of Equation (11) with only one loop. Consequently the time required to obtain the representation of disk seek activity will increase approximately as the number of logical volumes and, therefore, will be reduced significantly over the time required to obtain the value with a two-loop solution. A comparison involving a physical disk drive with eighteen logical volumes demonstrated that the single-loop solution provided a result in ⅛ of the time required to produce the result with the two-loop solution.

Step 123 then combines the seek time, however obtained, and the disk transfer times to obtain a subinterval utilization time that represents the total time that a physical disk operates in performing transfers including all of the seek, latency and data transfer times associated with that activity.

Step 124 in FIG. 5B determines whether all the subintervals have been processed. If more subintervals exist for the selected pair of logical volumes, step 124 branches back to step 120 to repeat the process of steps 120 and 123. When the subinterval utilization times have been obtained for all the subintervals, step 125 combines or sums the times to obtain a subinterval utilization time for that selected pair of logical volumes. Step 126 then determines whether additional pairs of logical volumes exist on the physical disk drive selected in step 116. If another pair of logical volumes exists, control passes back to step 117 to obtain the combined subinterval utilization times for that pair.

After all the utilization times for different logical volume pairs on the physical disk drive have been obtained and summed step 126 transfers control to step 127, thereby to sum the interval utilization times over the entire interval to drives are ordered by their respective time-based utilization statistics. In step 132 an exchangeable pair of logical volumes is selected. This selection process can be achieved in many ways. A simple approach is merely to define an exchangeable pair in which one of the pair is the busiest logical volume in the physical disk drive with the highest time-based utilization statistics and the second is the least busy logical volume on the physical disk drive having the lowest time-based utilization statistics. The philosophy is that if the busiest logical volume on the busiest physical drive is exchanged for the least busy volume on the least busy drive improved load balancing will be achieved.

Step 133 represents the procedure by which the previous process of steps 112 through 131 are repeated using the information from the proposed exchange disk drives. That is, in the particular example described above, the analysis would be revised by examining physical disk drives 31$a$ and 31$b$ to recalculate their various parameters assuming the LVE logical volume is exchanged with the M1-LVA logical volume. If an improvement seems likely, step 134 branches to step 75 representing either of the foregoing processes for exchanging logical volumes. If not, the analysis ends without making any exchange.

The foregoing analysis is described with a single selected exchangeable pair being analyzed. It will be also apparent that it may be advantageous to examine the changes in relative physical disk loading balance looking at the various combinations that could exist among all the exchangeable logical volumes pair taken one pair at a time. Typically, however, this will require such significant processing time as to become impractical. As still another alternative, a preset number of exchangeable pairs could be evaluated in order to limit the amount of time required to make a determination of whether an exchange would be beneficial.

In summary, this foregoing disclosure defines a various methods for balancing the load in a magnetic disk storage system comprising a plurality of physical disk drives. Typically each disk drive is divided into multiple logical volumes. Statistics of the occurrence of read, write, and sequential pre-fetch read operations and of the total amount of transferred data are maintained over at least an analysis interval as a function of time. The analysis interval comprises a series of sampling subintervals and uses a statistical analysis to process the data for each subinterval, for each pair of logical volumes within a single physical disk drive and for all total activity in terms of a physical disk drive utilization time representing the total time subinterval that the physical disk drive is involved in various read and write operations during the analysis interval. Several specific processes have been disclosed for obtaining this disk utilization time number for each logical volume in each physical disk storage device. Thereafter the disk utilization time information can be used in the selection of two candidates for a logical volume exchange. When a pair has been selected, one of two procedures as described above, enable the exchange to occur with minimal interruption to normal data processing operations.

The foregoing description discusses this invention in terms of data organized into blocks of contiguous storage locations on a physical disk storage device of known size called logical volumes. However, the invention is applicable to other data organizations. In some applications, for example, a logical volume might be divided into a series of sub-volumes distributed across plural physical disk storage devices. Such a division could be made for redundancy and recovery purposes or for load distribution purposes. Each block, whether a logical volume, sub-volume or other grouping, constitutes a block of contiguous storage locations of a predetermined size. Conversely and consequently, a block then can be a single logical volume, sub-volume or other grouping.

The invention as previously described, is equally applicable to such systems. That is, the method operates with any blocks of contiguous storage locations, be they organized as logical volumes, sub-volumes or other groupings. In essence and in accordance with any of the foregoing embodiments of this invention, various read and write statistics are accumulated for each block over a time interval. A list of all pairs of exchangeable blocks are established using the previously described size and other criteria that correspond to the criteria discussed in connection with step 63 in FIG. 2A. If a logical volume is divided into sub-volumes for redundancy, an additional criteria could prevent sub-volumes from the same logical volume from residing on one physical disk storage device. The configuration to be established is then evaluated in the same manner as the configuration is evaluated for an array divided into logical volumes, except for the evaluation being based on individual blocks. Assuming the configuration will provide better performance, the exchange is made in a manner that is analogous to the exchange in step 76 of FIG. 2B in accordance with the exchange procedure of FIG. 4.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. A method for balancing access activity on a plurality of physical disk storage devices including physical disk storage devices divided into blocks of contiguous storage locations and characterized by latency and data transfer times, said method comprising the steps of:
   A) compiling disk access statistics for each block over a time interval,
   B) compiling a list of exchangeable blocks on the physical disk storage devices,
   C) generating, in response to the compiled statistics, a disk utilization time including at least one of the latency and data transfer times, the disk utilization time representing the total time required to complete all disk accesses during the time interval,
   D) selecting one of the exchangeable blocks for transfer based upon the disk utilization times, and
   E) transferring the selected block to another block of contiguous locations.

2. A method as recited in claim 1 wherein the physical disk storage devices operate with an imbalance of activity, said step of selecting a configuration operating to select a configuration that reduces any imbalance of activity.

3. A method as recited in claim 1 wherein the step of determining the disk utilization time includes the step of obtaining a disk latency time for each disk access.

4. A method as recited in claim 3 wherein each physical disk is characterized by a given spindle speed of rotation and said step of obtaining disk latency times comprises generating a disk latency value proportional to the number of disk accesses during the time interval and inversely proportional to the spindle speed.

5. A method as recited in claim 4 wherein said disk latency time comprises generating a disk latency value that is the product of the number of disk accesses during the time interval and the time required for the spindle to rotate a portion of one revolution.

6. A method as recited in claim 1 wherein the step of determining the disk utilization time includes the step of determining data transfer time representing the time required to transfer data to and from the physical disk storage device during the time interval.

7. A method as recited in claim 6 wherein said disk access statistics compilation includes obtaining the amount of data transferred to and from blocks in a physical disk drive during a time interval and wherein each block is characterized by a data transfer rate representing the characteristic rate at which data transfers to and from the block, said step of obtaining data transfer times including generating a data transfer time that is proportional to the amount of data transferred during the time interval and inversely proportional to the characteristic data transfer rate for the block.

8. A method as recited in claim 6 wherein said disk access statistics compilation includes obtaining the amount of data transferred to and from blocks in a physical disk drive during a time interval and wherein each block is characterized by a data transfer rate representing the characteristic rate at which data transfers to and from the block, said step of generating data transfer times including generating a data transfer time that is the quotient of the amount of data transferred during the time interval and the characteristic data transfer rate for the block.

9. A method as recited in claim 6 wherein the step of determining the disk utilization time includes the step of obtaining disk latency time for each access.

10. A method as recited in claim 9 wherein each physical disk is characterized by a given spindle speed of rotation and said step of obtaining disk latency times comprises generating a disk latency value proportional to the number of disk accesses during the time interval and inversely proportional to the spindle speed.

11. A method as recited in claim 10 wherein said disk latency time comprises generating a disk latency value that is the product of the number of disk accesses during the time interval and the time required for the spindle to rotate a portion of one revolution.

12. A method as recited in claim 6 wherein each physical disk storage device includes movable read/write heads and at least one disk access involves a seek operation during which a read/write head moves from one location to another location on the physical disk storage device, said generation of disk utilization times additionally comprising the step of generating a seek time representing the total time required for seek operations during each subinterval.

13. A method as recited in claim 12 wherein said disk access statistics compilation includes obtaining the amount of data transferred to and from blocks in a physical disk drive during a time interval and wherein each block is characterized by a data transfer rate representing the characteristic rate at which data transfers to and from the block, said step of obtaining the data utilization time additionally including generating a data transfer time that is proportional to the amount of data transferred during the time interval and inversely proportional to the characteristic data transfer rate for the block.

14. A method as recited in claim 13 wherein each physical disk is characterized by a given spindle speed of rotation and said step of generating the disk utilization time additionally includes generating a disk latency value proportional to the number of disk accesses during the time interval and inversely proportional to the spindle speed.

15. A method as recited in claim 12 wherein said disk access statistics compilation includes obtaining the amount of data transferred to and from blocks in a physical disk drive during a time interval and wherein each block is characterized by a data transfer rate representing the characteristic rate at which data transfers to and from the block, said step of obtaining the data utilization time additionally including generating a data transfer time that is the quotient of the amount of data transferred during the time interval and the characteristic data transfer rate for the block.

16. A method as recited in claim 15 wherein the step of generating a disk utilization time additionally includes generating a disk latency value that is the product of the number of disk accesses during the time interval and the time required for the spindle to rotate a portion of one revolution.

17. A method for balancing activity on a plurality of physical disk storage devices including disk storage devices divided into a plurality of logical volumes and include movable read/write heads, said method comprising the steps of:
   A) compiling a list of exchangeable logical volumes on the physical disk storage devices,
   B) defining an analysis time interval comprising a plurality of subintervals;
   C) recording as a function of time in each subinterval, disk accesses for the transfer of data and the amount of data transferred for each logical volume,
   D) generating a disk utilization value in response to the disk accesses and the amount of transferred data recorded for each logical volume during each sub interval,
   E) selecting one of the logical volumes for transferring its data based upon the disk utilization values, and
   F) transferring the selected logical volume to another physical disk storage device.

18. A method as recited in claim 17 wherein said step of generating disk utilization values depends upon a latency value that is proportional to the number of accesses to a physical disk storage device and the rate at which the corresponding disk spindle rotates.

19. A method as recited in claim 17 wherein said step of generating disk utilization values depends upon the rate at which data transfers to and from a physical disk storage device in response to disk accesses.

20. A method as recited in claim 17 wherein disk accesses are segregated into access types including random read, sequential read and write-to-disk accesses, said generating of disk utilization values including the steps of weighting the number of accesses according to types before converting the number of accesses into disk utilization times and combining the number of weighted accesses for each sub-interval.

21. A method as recited in claim 20 wherein the value of the weighted accesses during each subinterval is given by:

$$\text{Weighted Accesses} = N_{rm} + \frac{N_{wr}}{2} + \frac{N_{sr}}{4}$$

where $N_{rm}$ and $N_{wr}$ represent read-miss and write accesses, $N_{sr}$ represents the number of sequential read access operations that occur during the subinterval.

22. A method as recited in claim 21 wherein the characteristic spindle speed is given by $\omega_s$ and the latency time, $t_1$, for a sub-interval is value is given by:

$$t_1 = \frac{k}{\omega_s}(N_{rm} + N_{wr} + N_{sr})$$

where "k" is a proportionality constant.

23. A method as recited in claim 22 wherein k=0.5.

24. A method as recited in claim 22 wherein each physical disk storage device is characterized by a data transfer rate, $D_{r,z}$ that represents the rate at which data transfers to and from the physical disk storage device and wherein said step for obtaining disk utilization time additionally includes the step of generating a disk transfer time value, $t_{dt,z,LV}$, according to:

$$t_{dt,z,LV} = \frac{|\text{Data}|_z}{D_{r,z}}.$$

25. A method as recited in claim 24 wherein each of the physical disk storage devices segregates groups of adjacent cylinders in zones having different characteristic data transfer rates, said step of obtaining the data transfer value for a logical volume including:
   i) determining the percentage of the logical volume that is located in each zone,
   ii) apportioning the data transfers to the logical volume according to the determined percentages,
   iii) generating a data transfer time for each zone according to the amount of data apportioned to the zone and the data transfer rate for that zone, and
   iv) combining the data transfers time for each zone to obtain a data transfer time for the logical volume.

26. A method as recited in claim 20 wherein each physical disk storage device is characterized by a data transfer rate, $D_{rz}$ that represents the rate at which data transfers to and from the physical disk storage device and wherein said step for obtaining disk utilization time additionally includes the step of generating a disk transfer time value, $t_{dt,n,LV}$, according to:

$$t_{dt,n,LV} = \frac{|\text{Data}|_{n,LV}}{D_{r,z}}.$$

27. A method as recited in claim 26 wherein each of the physical disk storage devices segregates groups of adjacent cylinders in zones having different characteristic data transfer rates, said step of obtaining the data transfer value for a logical volume including:
   i) determining the percentage of the logical volume that is located in each zone,
   ii) apportioning the data transfers to the logical volume according to the determined percentages,
   iii) generating a data transfer time for each zone according to the amount of data apportioned to the zone and the data transfer rate for that zone, and
   iv) combining the data transfers time for each zone to obtain a data transfer time for the logical volume.

* * * * *